June 26, 1934. D. SAMIRAN Re. 19,227

FLUID SEGREGATOR

Original Filed Sept. 28, 1927 3 Sheets-Sheet 1

INVENTOR
DAVID SAMIRAN.
BY Robert H. Young
ATTORNEY

June 26, 1934.

D. SAMIRAN

Re. 19,227

FLUID SEGREGATOR

Original Filed Sept. 28, 1927 3 Sheets-Sheet 2

INVENTOR
DAVID SAMIRAN
BY Robert H. Young
ATTORNEY

June 26, 1934.
D. SAMIRAN
Re. 19,227
FLUID SEGREGATOR
Original Filed Sept. 28, 1927
3 Sheets-Sheet 3
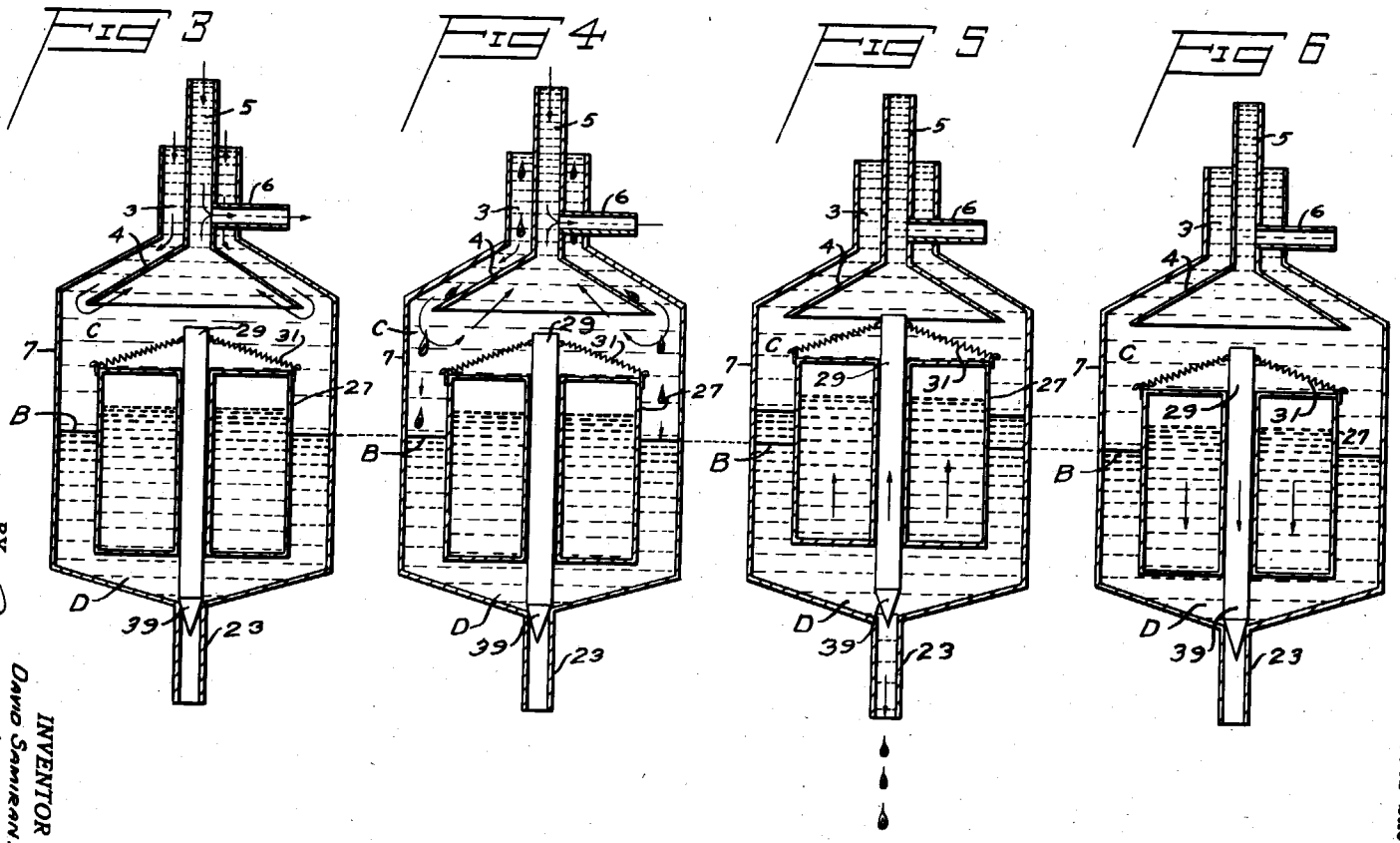
INVENTOR
DAVID SAMIRAN.
BY Robert H. Young
ATTORNEY Reissued June 26, 1934

Re. 19,227

UNITED STATES PATENT OFFICE 19,227

FLUID SEGREGATOR

David Samiran, Langley Field, Va., assignor of one-half to Phillips Melville, Langley Field, Hampton, Va.

Original No. 1,700,811, dated February 5, 1929, Serial No. 222,619, September 28, 1927. Application for reissue December 17, 1929, Serial No. 414,759

26 Claims. (Cl. 210—165)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a device for the automatic isolation of fluids, but more particularly to a device for straining and separating water and sediment from gasoline. The invention is applicable for the separation or isolation of any two fluids of different specific gravities which are non-miscible, such as oil and water.

The invention has for its object to provide certain material improvements in the art such as the adjustability of the float to any desired degree of buoyancy to adapt the device for use in the separation and isolation of various fluids which differ in specific gravity.

A further object of the invention is to provide means for obviating the effect of vibration between the float and the needle valve so that the device will properly function under the usual conditions of service.

With these and other objects in view, the invention consists of the construction, arrangement and combinations of parts, all of which will be first fully described and afterwards specifically pointed out in the appended claims.

Referring to the accompanying drawings:

Fig. 3 is a diagrammatic sectional view illustrating the location of the component parts.

Fig. 4 is a similar view illustrating the action of the deflector and the direction of flow of the lighter and heavier fluids within the device;

Fig. 5 is a similar view illustrating the buoyancy level of the float raised and the needle valve in position for discharging a quantity of the heavier fluid.

Fig. 6 is a similar view illustrating the buoyancy level restored and the needle valve returned into normal position after discharging the heavier fluid.

Like numerals of reference indicate the same parts throughout in order to illustrate the parts.

Figure 2:
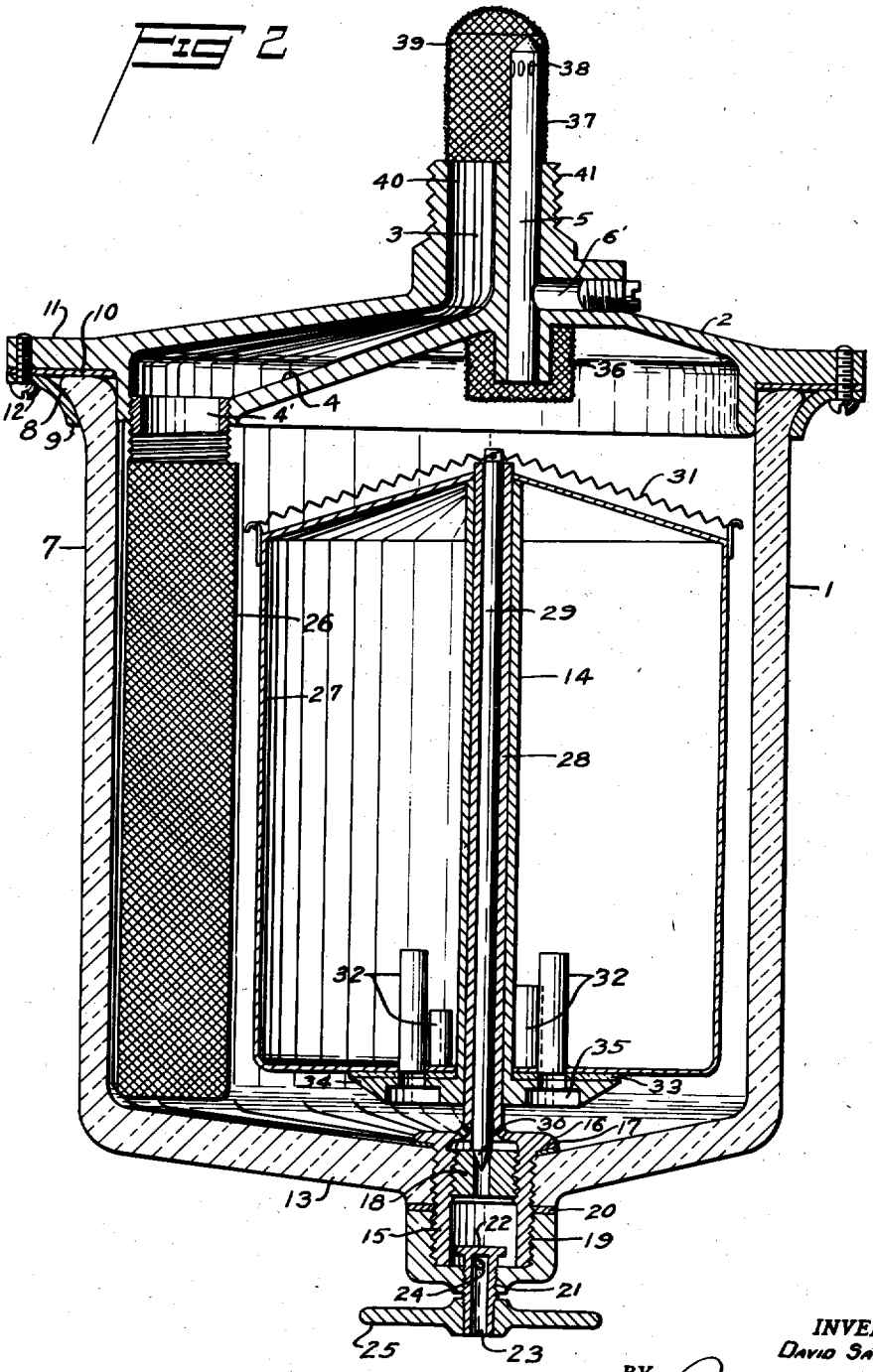
Fig. 2 is a vertical sectional view of the same.

1 indicates the isolator or separator, which includes the top casting 2 having therein the cored inlet passage 3, the deflector 4, and the circulating passage 5 with which the outlet passage 6′ connects. This outlet passage 6′ is shown in Fig. 2 as containing a threaded plug. This plug may be removed and a pipe or tube (not shown) may be connected to said passage to lead to a carburetter or the like.

Figure 1:
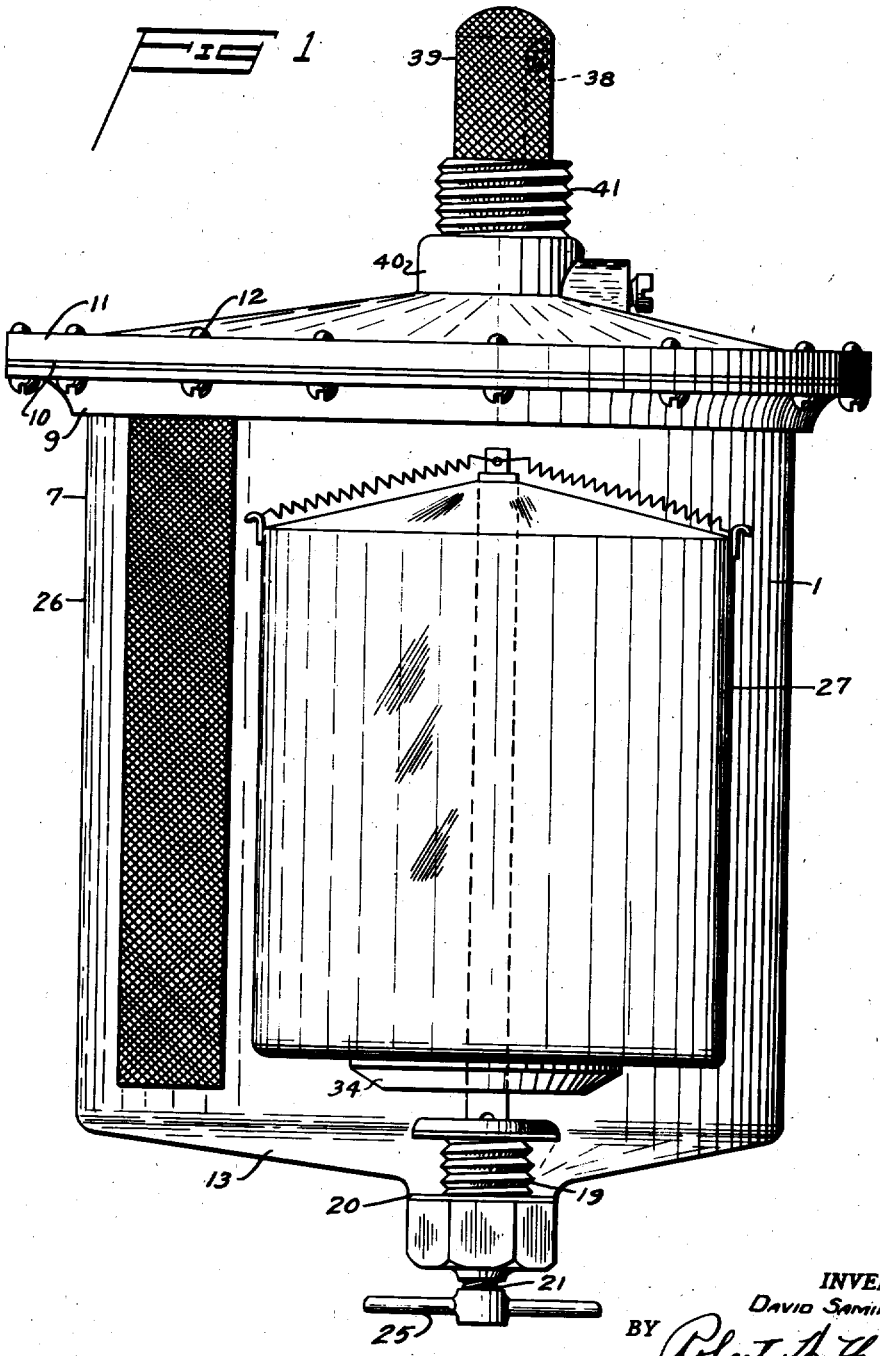
Fig. 1 is a side elevation of the device.

7 indicates the float chamber which may be of any suitable material, but which is shown of glass in the accompanying drawings. This chamber is conventionally shaped and has its upper edge slightly flared at 8 to be received by the clamping ring 9 against a suitable packing gasket 10, disposed under the flange 11 of the top casting. This assembly is effected by the screws 12 as shown in Figures 1 and 2.

The bottom 13 of the float chamber is apertured to receive the upstanding tubular valve-stem guide 14, which as shown in Figure 2, is provided with a threaded nipple-end 15 which is passed through the bottom 13 of the float chamber, said threaded end of the said guide also including a flange 16 under which is disposed a suitable packing gasket 17 to effect a fluid tight joint.

The said threaded end of the said guide is internally threaded to receive the centrally bored valve seat 18. Inclosing the threaded nipple-end 15, is a retaining nut 19 acting against a suitable packing gasket 20 by means of which retaining nut 19 this assembly is effected. Threaded in the bottom of said retaining nut 19 is a drain valve 21 which includes an upper flanged head 22 and a central bore 23, in communication with which bore is a drain port 24 through the wall of the valve 21. A wing nut 25 is secured to the bottom end of the valve 21, by means of which, rotation is imparted to said valve to raise or lower the flanged head 22 and to raise and lower the drain port 24 into and out of communication with the chamber formed by the threaded nipple-end 15.

26 indicates a long tubular screen located in the side of the float chamber and connected, as shown in Fig. 2 to the discharge end of the deflector 4 which tubular screen receives all fluids and sediment passing into the device.

27 indicates the float which is provided with a central tube 28 by means of which, said float is slidably mounted on the upstanding tubular valve-stem guide 14 heretofore described.

Resiliently and flexibly connected to the float 27 is the stem 29 of the needle valve 30, so that said valve is seated and unseated by the float 27, which connection is effected by the springs 31 as shown in Figs. 1 and 2.

Arranged in the bottom of the float is a series of stand pipes 32 of varying lengths (Fig. 2) which are arranged in pairs of the same length as shown in Fig. 2. Disposed under said series of stand pipes is a washer 33 and a lock washer 34, the same being provided with one pair of perforations 35 which may be brought in position to register with any one pair of said stand pipes 32 or to cover all the said stand pipes 32.

Disposed under the passage 5 leading to the outlet passage 6′ is a screen 36. At the upper end of said passage 5 is an upstanding closed-end tube 37 having a series of narrow slots 38 near the top thereof. Said tube extends above the threaded boss 40 to a height that will insure that when the segregator is connected by means of said boss to a pipe line, tank, or other source of fluid supply, it will insure that said slots 38 will be disposed above the maximum level of fluid of heavier specific gravity liable normally to accumulate in the pipe line, tank, or fluid source of supply so that only the fluid of lighter specific gravity can be inducted into passage 5 through said slots in the tube 37 when said fluid is being drawn off through the outlet passage 6. It will be understood that when the passage 6 is closed, passage 5 acts as a vent for the upward displacement of the lighter fluid. When, however, passage 6 is opened for use as an outlet for the liquid of lighter specific gravity, the passage 5 acts as a connecting medium to permit liquid of lighter specific gravity to be drawn off either from the source of supply, or from the float chamber, or from both. A sieve 39 is disposed over the inward passage 3 and over the upstanding tube 37 for a purpose hereinafter described.

Having thus described the component parts of this invention, its operation is as follows:

Fluid supplied to the device through a pipe or feed line tank or other supply (not shown) passes through the sieve 39 and thence into the inlet passage 3 onto the deflector 4 which inclines downwardly and outwardly whereby the inflowing fluid is directed toward the wall of the float chamber 7 thus protecting the float 27 from impact by the inflowing fluid and in conjunction with the venting action of passage 5 creates a circulation through the lead-passage 4′ tending to deliver the liquid of heavier specific gravity towards the bottom of the float chamber. The fluid then passes through the tubular sieve 26, thence into the float chamber 7. In order to adapt the device to the isolation or separation of the particular non-miscible fluids of different specific gravities to be handled, such as the isolation or separation of water from gasoline, the buoyancy of the float 27 is adjusted by the addition or subtraction of a liquid ballast so that it will float in the fluid of a heavier specific gravity but sink in a fluid of lighter specific gravity. The process of filling the float is as follows: The washer 33 and lock washer 34 under the float 27 are rotated until that pair of stand pipes which are of the length previously determined for water, are uncovered, and the float is inverted and then immersed in water and permitted to fill. The liquid enters one stand pipe and air escapes through the other so that the float fills up to the inner ends of the stand pipes, but no further, as the air remaining in the float is trapped in the float and precludes the further entry of water. It will thus be seen that the longer the stand pipe, the less the quantity of liquid can enter the float, so that by this means the float can be exactly and accurately weighted to adjust the relative buoyancy of the float, to the end that the buoyancy level "B" is maintained at constant height, as diagrammatically illustrated in Fig. 3, and that the volume of water measured into the float by the water stand pipes bears a definite relation to the weight of the float so that the float with the fluid ballast therein will have a definite known buoyancy relative to the fluid that is contained in the segregator. When the float has thus been filled, the washer 33 and lock washer 34 are again rotated to seal said stand pipes 32. The float is then reversed and assembled in position shown in the drawings.

In the diagrammatic views, the buoyancy level is indicated by "B" while "C" indicates the lighter component of the liquid such as gasoline, and "D" indicates the heavier component such as water which is separated and isolated by the device.

In Fig. 3, the arrows indicate the uninterrupted flow of the lighter component such as gasoline in the absence of the heavier component, such as water.

Fig. 4, however, illustrates a quantity of the heavier component such as water entering the device and illustrates the operation of the deflector 4 which facilitates the rapid separation of the two components. The lighter components in the float chamber being displaced by the heavier component entering the float chamber, pass out through the passage 5 and into the screen 39, in proportion to the quantity of the heavier component entering the float chamber, for as the heavier component enters the device, the lighter component already therein must be displaced therefrom in the same proportion. Such flow of the liquid will continue by reason of the inlet passage 3 and the passage 5, as long as the heavier component continues to enter the float chamber. I have found by experiment that in the absence of such an arrangement for permitting displacement of the lighter component from the device as by the provision of passages 3 and 5, the sudden introduction of a large quantity of the heavier component would tend to accumulate in the inlet passage by reason of the upward pressure of the lighter component within the float chamber, unless the inlet opening is comparatively large. Such latter construction, however, is unwieldy and undesirable. In order to overcome the disadvantage of a lodgment of a large quantity of the heavier component in the inlet passage 3 of the device, when a large quantity of the heavier component is suddenly introduced into the device, the circulating passage 5 is provided which permits and allows the displacement of the lighter component from the float chamber into the feed line and at a point above the inlet passage 3. This prevents and overcomes the tendency of a suddenly introduced large quantity of the heavier component to lodge in the inlet passage 3, by permitting such heavier component to pass into the float chamber. The action is somewhat analogous to that of a venting action, in that it provides for the displacement from the float chamber of a quantity of the lighter component sufficient to permit the entrance of the heavier component therein, since a quantity of the heavier component cannot be suddenly introduced into the float chamber unless an equal volume of the lighter component is displaced therefrom to provide for the entrance of the heavier component. The circulating passage 5 is provided to assist in the necessary displacement of the lighter component from the float chamber upon the sudden introduction therein of a large quantity of the heavier component.

When the passage 5 operates as a conduit to permit the flow of the lighter liquid from the source of supply to the outlet passage 6, this liquid must first pass through sieve 39 and then through the narrow slots 38 whereby sediment is prevented from entering passage 5.

When a sufficient quantity of the heavier component enters the float chamber, it causes a rise in the buoyancy level B, as from dotted lines in Fig. 5 to full lines in said figure. By reason of the relative buoyancy, the float is displaced upwardly as shown in said figure which raises the needle-valve 30 and permits the escape of the heavier component through the drain 23. This discharge continues until the buoyancy level B is restored, at which level the float has descended into position to reseat the needle-valve 30 and shut off further evacuation of the heavier component as shown in Fig. 6. This action is automatically repeated each time the quantity of the heavier component in the float chamber becomes sufficient to cause a rise in the buoyancy level.

Under certain conditions and particularly those existing in vehicles of all kinds, movement, tilting and vibration thereof may seriously interfere with the proper functioning of a device of this class. For this reason I prefer to mount and suspend the needle valve 39 and stem 29 as heretofore described, and thereby obviate any direct or frictional contact between the said stem and the float, while the flexible or resilient spring connection employed, permits free vertical movement of the float within the limits of the resiliency of the springs without imparting any movement to the needle-valve. By this means vibration affecting the float is absorbed by the springs without affecting the normal seated position of the needle valve.

The term "non-miscible fluids" as used in the specification is intended to mean a fluid or fluids which tend to stratify in a container in accordance with their relative specific gravities.

Having thus fully described the invention, it may be obvious to those skilled in the art that the construction shown and described is subject to changes, alterations and modifications. I am fully aware of this and it is to be understood that the specific construction shown in the accompanying drawings are merely illustrative of any preferred construction, and that I consider myself clearly entitled to all such changes and modifications as fall within the limit and scope of the appended claims.

I claim:

1. A device of the character described including a float chamber, a top member therefor having an inlet, a deflector, a circulating and an outlet passage in said top member, a sieve to receive fluid from said deflector, a float within said float chamber, an upstanding valve-stem guide within said float chamber, upon which guide the said float is slidably mounted, a needle-valve and stem, the stem of said needle-valve being slidably mounted in said guide, a needle-valve seat, said float chamber being provided with a discharge passage commanded by said needle valve, means for resiliently connecting said float with said needle-valve, and means for adjusting the buoyancy of said float, the whole arranged for the separation and isolation of fluids of different specific gravities within the float chamber.

2. A device of the character described including a float chamber, a top member therefor having an inlet passage, a deflector and an outlet passage in said top member, a sieve to receive fluid from said inlet passage and deflector, a float within said float chamber, an upstanding valve-stem guide within said float chamber upon which guide the said float is slidably mounted, a needle-valve and stem, the stem of said needle-valve being slidably mounted in said guide, a needle-valve seat, said float chamber being provided with a discharge passage commanded by said needle-valve, means for resiliently connecting said float with said needle-valve, and means for adjusting the buoyancy of said float, the whole arranged for the separation and isolation of fluids of different specific gravities within the float chamber.

3. A device of the character described including a float chamber, a top member therefor having an inlet, a deflector, a circulating and an outlet passage in said top member, a sieve to receive fluid from said deflector, a float within said float chamber, an upstanding valve-stem guide within said float chamber upon which guide the said float is slidably mounted, a needle-valve and stem, the stem of said needle-valve being slidably mounted in said guide, a needle-valve seat, said float chamber being provided with a discharge passage commanded by said needle-valve, and means for resiliently connecting said float with said needle-valve, the whole arranged for the separation and isolation of fluids of different specific gravities within the float chamber.

4. A device of the character described including a float chamber, a top member therefor having an inlet passage, a deflector extending downwardly and outwardly for deflecting the incoming fluid toward the side wall of said chamber and an outlet passage in said top member, a sieve to receive fluid from said inlet passage and deflector, a float within said float chamber, an upstanding valve stem guide within said float chamber upon which guide the said float is slidably mounted, a needle-valve and stem, the stem of said needle-valve being slidably mounted in said guide, a needle-valve seat, said float chamber being provided with a discharge passage commanded by said needle-valve, and means for resiliently connecting said float with said needle-valve, the whole arranged for the separation and isolation of fluids of different specific gravities within the float chamber.

5. A device of the character described including a float chamber, a top member therefor having an inlet, a deflector, a circulating and an outlet passage in said top member, a sieve to receive fluid from said deflector, a float within said float chamber, an upstanding valve-stem guide within said float chamber upon which guide the said float is slidably mounted, a needle-valve and stem, the stem of said needle-valve being slidably mounted in said guide, a needle-valve seat, said float chamber being provided with a discharge passage commanded by said needle-valve.

6. A device of the character described including a float chamber having an inlet passage for the introduction of a fluid having a light and a heavy component, an outlet passage for the light component and an outlet for the heavy component, a float, a needle valve actuated by the float for commanding the outlet for the heavy component, and means in addition to the outlet passage for the light component for facilitating the displacement from the float chamber of the light component within the chamber upon entrance of the heavy component therein through said inlet passage.

7. A device of the character described including a float chamber, a fluid inlet and outlet, a float in said float chamber, means for adjusting the buoyancy of the float, and means in addition to the fluid outlet and constituting a part thereof for facilitating the displacement from the float chamber of a light component of a fluid therein upon entrance of a heavy component within the float chamber.

8. A device of the character described, including a float chamber, a fluid inlet and outlet, a float in said float chamber, a needle valve and stem, means for resiliently connecting the float with the needle valve and stem, means for adjusting the buoyancy of the float, and means in addition to the fluid outlet for facilitating the displacement from the float chamber of a light component therein, upon entrance of a heavy component within the float chamber.

9. A device of the character described including a float chamber, a top member therefor having an inlet and an outlet passage and a circulating passage providing means for facilitating the displacement from the float chamber of a lighter component upon the entrance of a heavier component through said inlet passage, a float within said float chamber, a needle valve and seat, said float chamber being provided with a discharge passage commanded by said needle valve and means for resiliently connecting said float with the needle valve, the whole arranged for the separation and isolation of fluids of different specific gravities within the float chamber.

10. A device of the character described including a float chamber and an inlet and an outlet passage for introducing fluid to and from the float chamber and including in addition thereto, means for facilitating the displacement from the float chamber of a lighter component upon the entrance of a heavier component through said inlet passage, a float within said float chamber, a needle valve and seat, said float chamber being provided with a discharge passage commanded by said needle valve, the whole arranged for the separation and isolation of fluids of different specific gravities within the float chamber.

11. A device of the character described including a float chamber, a float, a needle valve and seat and an opening commanded by the needle valve, a top member for the float chamber, the same having an inlet, a deflector and a circulating and an outlet passage.

12. A device according to claim 1, in which the means for adjusting the buoyancy of the float, includes a plurality of standpipes of varying lengths extending within the float from the bottom thereof.

13. A device according to claim 2, in which the means for adjusting the buoyancy of the float, includes a plurality of standpipes of varying lengths extending within the float from the bottom thereof.

14. A device according to claim 1, in which the means for adjusting the buoyancy of the float, includes a plurality of standpipes extending within the float from the bottom thereof.

15. A device according to claim 2, in which the means for adjusting the buoyancy of the float includes a plurality of standpipes extending within the float from the bottom thereof.

16. A float of predetermined weight comprising a casing having a chamber to receive a fluid ballast of known specific gravity and selective means disposed within said float chamber, comprising a plurality of measures, each measure corresponding to a desired quantity measure of a given liquid ballast, for measuring and automatically limiting the quantity of said ballast to be received within said chamber.

17. A float of predetermined weight comprising a casing having a chamber to receive a fluid ballast of known specific gravity and selective means within said chamber comprising a plurality of stand pipes, each stand pipe corresponding to a desired quantity measure of a given liquid ballast, for measuring and automatically limiting the quantity of said ballast to be received within said chamber.

18. In combination, a tank, a segregator adapted to isolate fluids of different specific gravities entering said segregator from said tank comprising a chamber having a comparatively restricted fluid inlet, vent means associated with said fluid inlet and tank to facilitate the displacement of fluids of lighter specific gravity back to the source upon entrance of a fluid of heavier specific gravity through the fluid inlet, and an outlet passage in direct communication with said vent means for fluids of lighter specific gravity contained in said tank and segregator.

19. A device of the character described including a float chamber, a fluid inlet and outlet, a valve member to control said outlet, a guide for said valve member, a float disposed within said chamber for actuating said valve having a liquid ballast therein, a plurality of tubes of different lengths disposed within said float and adapted to cooperate with liquids of different specific gravity for limiting the quantity of ballast contained within said float, and means resiliently connecting said float with said valve the whole arranged for the separation and isolation of fluids of different specific gravities within the fluid chamber.

20. A segregator adapted to isolate fluids of different specific gravities comprising a chamber, a fluid inlet, venting means to permit the displacement of fluids of lighter specific gravity back to the source, upon entrance of a fluid of heavier specific gravity through said fluid inlet and a deflector within said segregator to direct the flow of fluid downwardly and outwardly toward the sides of the segregator to facilitate the displacement in the chamber of the lighter fluid by the heavier fluid.

21. A segregator adapted to isolate fluids of different specific gravities, comprising a chamber, a restricted fluid inlet, venting means to permit the displacement of fluids of lighter specific gravity back to the source, upon entrance of a fluid of heavier specific gravity through said fluid inlet and a deflector within said segregator to direct the fluid flow downwardly and outwardly toward the side of said chamber.

22. A segregator for isolating non-miscible liquids of different specific gravities, comprising in combination, a float chamber having a fluid inlet and a fluid outlet, and valve means including a float and a valve operated by said float for automatically controlling said outlet, said float having means constituting a part of said float for measuring a predetermined quantity of a given liquid ballast to be continued therein for adjusting said float so that it will assume a predetermined buoyant position in the liquid to be segregated but which will sink in a given liquid of less specific gravity.

23. A segregator for isolating non-miscible liquids of different specific gravities, comprising in combination, a float chamber having a fluid inlet and a fluid outlet, a float and a valve yieldingly connected to said float and seated against said outlet and operated by said float for automatically controlling said outlet, said float having means for measuring a predetermined quantity of a given liquid ballast to be contained therein for adjusting said float so that it will assume a predetermined buoyant position in the liquid to be segregated but which will sink in a given liquid of less specific gravity.

24. A float device adjustable to different mean specific gravities corresponding to liquids of different specific gravities so as to assume substantially the same buoyant position irrespective of the liquid to which it is adjusted, comprising a container having a chamber and measuring means cooperating with said chamber and forming a part of said float for measuring a predetermined quantity of a given liquid such that said float will assume said predetermined buoyant position when immersed in the liquid to which it is adjusted.

25. A float device adjustable to different mean specific gravities corresponding to liquids of different specific gravities so as to assume substantially the same buoyant position irrespective of the liquid to which it is adjusted, comprising a container having a chamber and selective measuring means cooperating with said chamber and forming a part of said float for measuring a predetermined quantity of a given liquid such that said float will assume said predetermined buoyant position when immersed in the liquid to which it is adjusted.

26. A float device adjustable to different mean specific gravities corresponding to liquids of different specific gravities so as to assume substantially the same buoyant position irrespective of the liquid to which it is adjusted, comprising a container having a chamber and a plurality of measures positioned within said chamber and forming a part of said float for measuring a predetermined quantity of a given liquid such that said float will assume said predetermined buoyant position when immersed in the liquid to which it is adjusted.

DAVID SAMIRAN.